US009331799B2

(12) United States Patent
Gao et al.

(10) Patent No.: US 9,331,799 B2
(45) Date of Patent: May 3, 2016

(54) SYNCHRONOUS AUDIO PLAYBACK (71) Applicant: Bose Corporation, Framingham, MA (US)

(72) Inventors: Yong Gao, Hopkinton, MA (US); Conor Sheehan, Arlington, MA (US); Rameshwar Sundaresan, Shrewsbury, MA (US)

(73) Assignee: Bose Corporation, Framingham, MA (US)

( * ) Notice: Subject to any disclaimer, the term of this patent is extended or adjusted under 35 U.S.C. 154(b) by 94 days.

(21) Appl. No.: 14/047,834

(22) Filed: Oct. 7, 2013

(65) Prior Publication Data
US 2015/0100143 A1   Apr. 9, 2015

(51) Int. Cl.
| G06F 17/00 | (2006.01) |
| H04H 20/18 | (2008.01) |
| G06F 3/16 | (2006.01) |
| H04L 29/06 | (2006.01) |
| H04N 21/43 | (2011.01) |
| H04N 21/8547 | (2011.01) |

(52) U.S. Cl.
CPC ............... H04H 20/18 (2013.01); G06F 3/16 (2013.01); H04L 65/4076 (2013.01); H04N 21/4307 (2013.01); H04N 21/8547 (2013.01)

(58) Field of Classification Search
CPC .......... H04N 21/242; H04N 21/4307; H04N 21/43615; H04N 21/4302; H04N 21/4392; H04N 5/935; H04H 20/18; H04R 3/12
See application file for complete search history.

(56) References Cited

U.S. PATENT DOCUMENTS

| 2006/0149850 A1 | 7/2006 | Bowman |
| 2009/0190582 A1 | 7/2009 | Nambiath et al. |
| 2010/0179672 A1* | 7/2010 | Beckmann et al. ............. 700/94 |
| 2012/0303705 A1 | 11/2012 | Park et al. |
| 2013/0251329 A1 | 9/2013 | McCoy et al. |

FOREIGN PATENT DOCUMENTS

WO   2008046143 A1   4/2008

OTHER PUBLICATIONS

The International Search Report and The Written Opinion of the International Searching Authority mailed on Dec. 23, 2014 for corresponding PCT Application No. PCT/US2014/059324.

* cited by examiner

Primary Examiner — Andrew C Flanders
(74) Attorney, Agent, or Firm — Brian M. Dingman; Dingman IP Law, PC (57) ABSTRACT A method and device for synchronously playing audio data over a number of audio playback devices that are connected to a network. The distribution of particular audio data to a plurality of audio playback devices that are adapted to play audio, where the audio playback devices are all connected to a network over which audio data is delivered from a digital audio source to the audio playback devices, can be accomplished by determining when more than one of the audio playback devices has been directed to play the particular audio data, and in response to the determination directing that two or more of the audio playback devices synchronously play the particular audio data.

19 Claims, 9 Drawing Sheets

SYNCHRONOUS AUDIO PLAYBACK

BACKGROUND

This disclosure relates to the distribution of audio data over a network.

Audio systems can be arranged to stream digital audio data to one or more of multiple audio playback devices that are connected to a network such as a local area network (LAN). Each audio playback device is able to play the audio data through one or more loudspeakers. In some such networked audio systems a master device receives the audio data from an audio source and manages the distribution of the data over the network to the other audio playback devices, which are considered slaves that receive and then play the audio that is served by the master.

SUMMARY

There are situations in which a user desires to synchronize a number of audio playback devices so that all of the devices are playing the same music. An example may be in a home with audio playback devices in several rooms. The user may desire to hear the same music playing as the user moves between rooms.

Digital audio sources such as internet radio stations stream digital audio content. However, such sources typically provide a single stream for a single account. Typically such sources are not able to send the same stream simultaneously to multiple audio playback devices that are associated with a single user account. In cases where the source delivers a single audio stream, the stream can be rendered on multiple audio playback devices by designating one device as a master audio playback device and the other devices as slaves. The master acts as the gateway for streaming digital audio from the source to one or more slave devices. The master can control the distribution and timing of the rendering of the audio data such that all of the devices play the audio synchronously.

All examples and features mentioned below can be combined in any technically possible way.

In one aspect a method for managing the distribution of particular audio data to a plurality of audio playback devices that are adapted to play audio, where the audio playback devices are all connected to a network over which audio data is delivered from a digital audio source to the audio playback devices, includes determining when more than one of the audio playback devices has been directed to play the particular audio data and in response to the determination directing that two or more of the audio playback devices synchronously play the particular audio data.

Embodiments may include one of the following features, or any combination thereof. The particular audio data may be streamed audio data. The audio playback devices may each comprise a set of user-selectable preset indicators, wherein each preset indicator is configured to have assigned to it a digital audio source. Determining when more than one of the audio playback devices has been directed to play the particular audio data may comprise determining whether a digital audio source selected by way of the user selection of a preset indicator of one of the audio playback devices is the same as the digital audio source for a different audio playback device. Directing that two or more of the audio playback devices synchronously play the particular audio data may comprise designating one of the audio playback devices as a master device and one or more other audio playback devices as slave devices, where the master device controls the distribution of audio data to the slave devices. The method may further comprise establishing a data connection between the master device and the audio source, and establishing data connections between the master device and the slave devices. The master device may receive an audio stream from the audio source and manage its distribution to the slave devices. The master device may format the received audio stream into packets and associate with the packets a time stamp that indicates when the packets are to be rendered into audio by the slave devices.

Embodiments may include one of the following features, or any combination thereof. Each audio playback device may comprise a computer memory, and the method may further comprise storing in the memory of each audio playback device an identification of each other audio playback device. The identification of the other audio playback devices stored in the memory may comprise the network address of each other audio playback device. Determining when more than one of the audio playback devices has been directed to play the particular audio data may comprise detecting the audio source for a particular audio playback device. Determining when more than one of the audio playback devices has been directed to play the particular audio data may further comprise comparing the detected audio source for the particular audio playback device to the audio sources for the other audio playback devices. The method may further comprise storing in the memory of each audio playback device an identification of any audio that is being played by each other audio playback device.

In another aspect a method for managing the distribution of streamed audio data to a plurality of audio playback devices that are adapted to play audio, where the audio playback devices are all connected to a network over which audio data is delivered from a digital audio source to the audio playback devices, and wherein the audio playback devices each comprise a set of user-selectable preset indicators, wherein each preset indicator is configured to have assigned to it a digital audio source, includes determining when more than one of the audio playback devices has been directed to play the particular audio data, wherein determining when more than one of the audio playback devices has been directed to play the particular audio data comprises determining whether a digital audio source selected by way of the user selection of a preset indicator of one of the audio playback devices is the same as the digital audio source for a different audio playback device. In response to the determination, that two or more of the audio playback devices are directed to synchronously play the particular audio data, wherein directing that two or more of the audio playback devices synchronously play the particular audio data comprises designating one of the audio playback devices as a master device and one or more other audio playback devices as slave devices, where the master device controls the distribution of audio data to the slave devices. A data connection is established between the master device and the audio source. Data connections are established between the master device and the slave devices. The master device receives an audio stream from the audio source and manages its distribution to the slave devices. The master device formats the received audio stream into packets and associates with the packets a time stamp that indicates when the packets are to be rendered into audio by the slave devices.

In another aspect a computer device configured to manage the distribution of particular audio data to a plurality of audio playback devices that are adapted to play audio, where the audio playback devices are all connected to a network over which audio data is delivered from a digital audio source to the audio playback devices, includes a memory and a processor communicatively coupled to the memory and that is configured to determine when more than one of the audio playback devices has been directed to play the particular audio data and in response to the determination, direct that two or more of the audio playback devices synchronously play the particular audio data.

Embodiments may include one of the following features, or any combination thereof. The audio playback devices may each comprise a set of user-selectable preset indicators, wherein each preset indicator is configured to have assigned to it a digital audio source, and wherein determining when more than one of the audio playback devices has been directed to play the particular audio data comprises determining whether a digital audio source selected by way of the user selection of a preset indicator of one of the audio playback devices is the same as the digital audio source for a different audio playback device.

Embodiments may include one of the following features, or any combination thereof. Directing that two or more of the audio playback devices synchronously play the particular audio data may comprise designating one of the audio playback devices as a master device and one or more other audio playback devices as slave devices, where the master device controls the distribution of audio data to the slave devices. The master device may receive an audio stream from the audio source and manage its distribution to the slave devices, and the master device may format the received audio stream into packets and associate with the packets a time stamp that indicates when the packets are to be rendered into audio by the slave devices.

Embodiments may include one of the following features, or any combination thereof. Each audio playback device may comprise a computer memory and the processor may be further configured to cause the storage in the memory of each audio playback device an identification of each other audio playback device; the identification of the other audio playback devices stored in the memory may comprise the network address of each other audio playback device. Determining when more than one of the audio playback devices has been directed to play the particular audio data may comprise detecting the audio source for a particular audio playback device and comparing the detected audio source for the particular audio playback device to the audio sources for the other audio playback devices.

DETAILED DESCRIPTION

An audio distribution system that has a number of audio playback devices can be enabled to have more than one of the devices synchronously play a single audio stream. This can be accomplished by designating one device as a master audio playback device and the other devices as slaves. The master acts as the gateway for streaming digital audio to one or more slave devices. The master can control the distribution and timing of the rendering of the audio data such that all of the devices play the audio stream synchronously.

Figure 1:
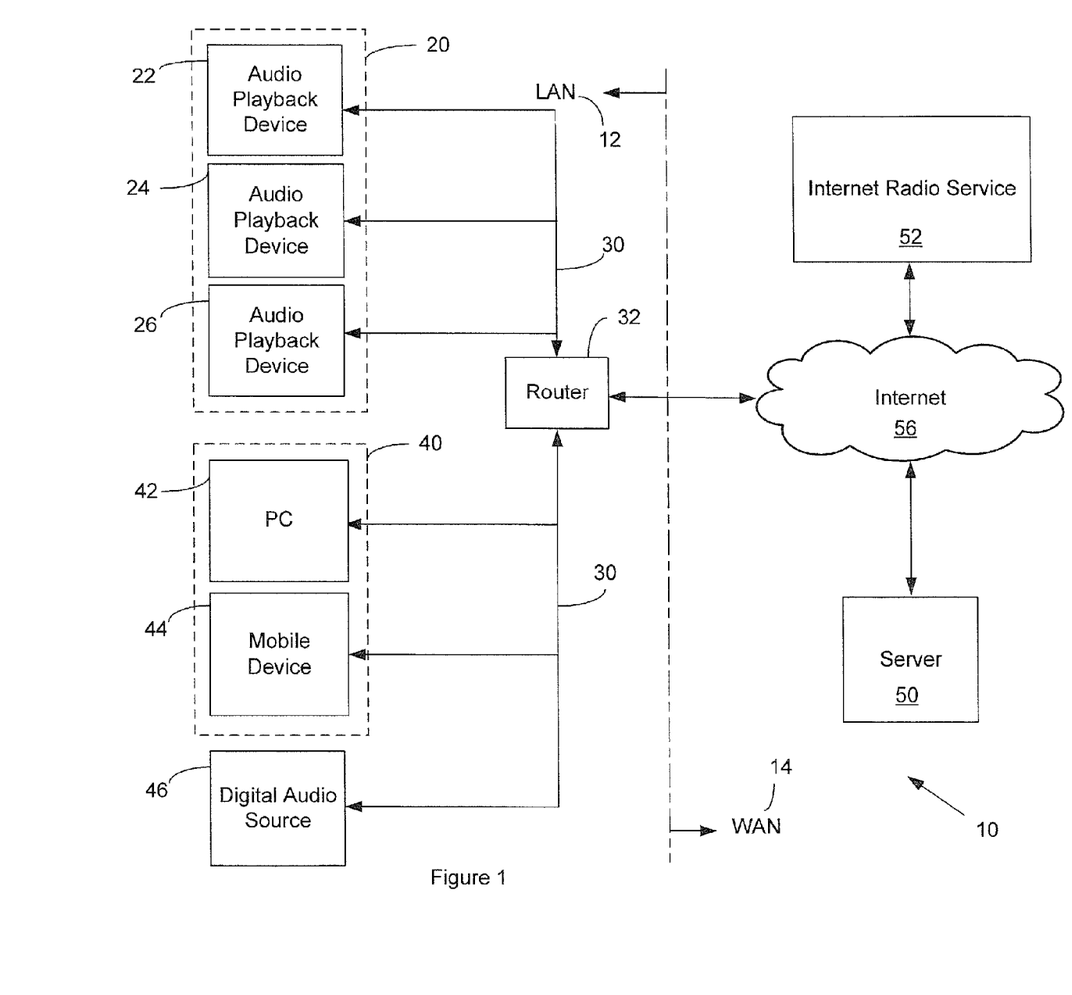
FIG. 1 is a schematic block diagram of an audio distribution system that facilitates the synchronous playback of a single audio stream on a number of audio playback devices.

Audio distribution system 10, FIG. 1, can be used to accomplish a method for managing the distribution of particular audio data to audio playback devices that are connected to a network, and also includes the computer devices that are involved in this audio data distribution. System 10 is adapted to deliver digital audio (e.g., digital music). System 10 includes a number of audio playback devices 22, 24 and 26 which are among the group of audio output devices 20 of the system. In one non-limiting embodiment, the audio playback devices are identical devices that each include a digital to analog converter that is able to receive digital audio signals and convert them to analog form. The audio playback devices also include an electro-acoustic transducer that receives the analog audio signals and transduces them into sound. The audio playback devices also include a processor. The audio playback devices are connected to one another and also connected to the router/access point 32 via network 30. The audio playback devices are thus able to communicate with one another. Network 30 can be a wired and/or wireless network. Network 30 is part of LAN 12 which is connected to wide area network (WAN) 14, in this non-limiting example by connection to Internet 56. LAN 12 also includes one or more computing devices 40 and one or more local music sources 46. In this non-limiting example the computing devices include a personal computer 42 and a mobile device 44 such as a smart phone, tablet or the like. WAN 14 includes server 50 and Internet radio service 52 which can both communicate with the LAN via Internet 56.

One use of system 10 is to simultaneously play a single audio stream over more than one of the audio playback devices 22, 24 and 26 in group 20. The sources of digital audio provide access to content such as audio streams that move over network 30 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify® and vTuner®, for example. Network attached storage devices such as digital audio source 46, and media server applications such as may be found on a mobile device, can also be sources of audio data. The user may select the audio source and the playback devices via PC 42 and/or mobile computing device (e.g., smartphone or tablet) 44. The user may also select the audio source and the playback devices via an audio playback device in group 20.

The audio playback devices can be electronic devices which are capable of rendering (i.e., playing) audio content. These devices can access stored audio content (e.g., remotely stored audio content) and stream it for playback. In some cases, the audio playback devices may also be capable of playing locally stored content. These devices render audio with the help of audio codecs and digital signal processors (DSPs) available within them.

The audio playback devices can communicate with each other. For example, each audio playback device can communicate with the other audio playback devices within the audio system, e.g., for synchronization. This can be a synchronization of device settings, such as synchronization of preset assignments, or, for synchronization of playback (e.g., such that all or a subset of the audio playback devices play the same content simultaneously and synchronously).

The digital audio sources are devices and/or services that provide access to one or more associated entities for supplying content (e.g., audio streams) to the audio playback devices, and which can be located remotely from the audio playback devices. An "entity," as used herein, refers to a grouping or collection of content for playback. Exemplary entities include Internet radio stations and user defined playlists. "Content" is data (e.g., an audio track) for playback. "Associated entity" refers to an entity that is associated with a particular audio source. For example, if the digital audio source is an Internet music service such as Pandora®, an example associated entity would be a radio station provided by Pandora®.

For the purposes of audio system 10, audio streams are considered to be data. They are processed as digital information that is converted to analog before presentation. Data streaming is the method by which data is moved from an audio source to an audio playback device. Typically, there are two models for this data movement, push and pull. The audio system 10 is capable of managing this audio (data) streaming in both fashions; descriptions of these processes are as follows.

In a push model, the digital audio source will move the data to the audio playback device at a pace that it desires. The recipient (e.g., one of the audio playback devices) of the data will acknowledge the data and the digital audio source will provide more data. This model requires the digital audio source to manage the throughput characteristics of the audio system 10. In a pull model, the audio playback device will request data from the digital audio source at a rate it desires. This allows the audio playback device to read ahead if data is available.

The digital audio sources each maintain a repository of audio content which can be chosen by the user to play. The digital audio sources can be based on the Digital Living Network Alliance® (DLNA) or other Web based protocols similar to the Hypertext Transfer Protocol (HTTP). Some of the devices and services in this category include Internet based music services such as Pandora®, Spotify®, and vTuner®; network-attached storage (NAS) devices, and a media server daemon (e.g., provided as a component of a computer-based controller).

The digital audio sources include user defined playlists of digital music files available from network audio sources such as network-attached storage (NAS) devices, and a DLNA server which may be accessible to the audio playback devices over a local area network such as a wireless (Wi-Fi) or wired (Ethernet) home network, as well as Internet radio sites such as Pandora®, vTuner®, Spotify®, etc., which are accessible to the audio playback devices over a wide area network such as the Internet.

The controllers are responsible for controlling the audio playback devices and for browsing the audio sources in the audio system. Some of the devices in this controller category include desktop computers, laptop computers, and mobile computing devices such as smart phones and tablets. These devices control the audio playback devices via a wireless communication interface (e.g., IEEE 802.11 b/g, Bluetooth LE, infrared, etc.) The controllers serve as an online management tool for a user's network-enabled audio playback devices. The controllers provide interfaces which enable the user to perform one or more of the following: setup a connection to a Wi-Fi network; create an audio system account for the user; sign into a user's audio system account and retrieve information; add or remove an audio playback device on a user's audio system account; edit an audio playback device's name, and update software; access the audio sources (via the audio playback devices); assign an entity (e.g., a playlist or radio station) associated with one of the audio sources to a "preset" indicator; browse and select recents, where "recents" refers to recently accessed entities; use transport controls (play/pause, next/skip, previous), view "Now Playing" (i.e., content currently playing on an audio playback device) and album art; and adjust volume levels.

In some cases, the controllers may include network controllers and auxiliary controllers. The network controllers are controllers that communicate with the audio playback devices over a wireless (Wi-Fi) network connection. The network controllers can include primary network controllers and secondary network controllers. The primary network controllers can be utilized for: connecting an audio playback device to a Wi-Fi network (via a USB connection between the audio playback device and the primary network controller); creating a system account for the user; setting up music services; browsing of content for playback; setting preset assignments on the audio playback devices; transport control (e.g., play/pause, fast forward/rewind, etc.) for the audio playback devices; and selecting audio playback devices for content playback (e.g., single room playback or synchronized multi-room playback). Devices in the primary network controller category can include desktop and laptop computers.

The secondary network controllers may offer some, but not all, of the functions of the primary network controllers. For example, the secondary network controllers may not provide for all of the account setup and account management functions that are offered by the primary network controllers. The secondary network controllers may be used for: music services setup; browsing of content; setting preset assignments on the audio playback devices; transport control of the audio playback devices; and selecting audio playback devices for content playback: single room or synchronized multi-room playback. Devices in the secondary network controller category can include mobile devices such as smart phones and tablets.

The auxiliary controllers communicate wirelessly (e.g., via Bluetooth low energy (BTLE) or IR) with an associated (e.g., paired) one of the audio playback devices. The auxiliary controllers may offer limited functionality. The auxiliary controllers may be used for: browsing of content; setting of preset assignments on the associated one of the audio playback devices; and transport control (play/pause, etc.) of the associated audio playback device.

Server 50 is a cloud-based server which contains (e.g., within an account database) information related to a user's audio system account. This includes user account information such as the list of the audio playback devices within system 10, device diagnostic information, preset assignments, etc. The server will be connected to by the audio playback devices and by the controllers (e.g., by primary network controllers) for the purpose of preset management, as well as management of audio sources and management of the user's audio system account. Generally, the controllers (e.g., network controllers) will login to the server with a user's login details and 'sync down' the required information to work with.

The audio playback devices and one or more of the controllers are coupled to a local area network (LAN) 30. Other devices such as one or more of the digital audio sources (e.g., a network-attached storage (NAS) device) may also be coupled to the LAN. The LAN may be a wired network, a wireless network, or a combination thereof. In one example, the devices (e.g., audio playback devices and controllers (e.g., primary and secondary controllers)) within the LAN are wirelessly coupled to the LAN based on an industry standard such as IEEE 802.11 b/g. The LAN may represent a network within a home, an office, or a vehicle. In the case of a residential home, the audio playback devices may be arranged in different rooms (e.g., kitchen, dining room, basement, etc.) within the home. The devices within the LAN connect to a user-supplied access point (e.g., router 32) and subsequently to a wide area network (WAN) 14 (e.g., the Internet) for communication with the other digital audio sources (e.g., Internet based music services) and server 50.

The audio system can provide for the management of presets (a/k/a preset assignments). Presets are a set of (e.g., six) user-defined shortcuts to content, intended to provide quick access to entities associated with the digital music sources from (1 of 6) preset indicators present on each of the audio playback devices. In some cases, the preset indicators can be hardware buttons. Alternatively, the preset indicators may be virtual buttons defined by regions on a touch sensitive display. The individual preset indicators can be denoted with numerical identifiers.

The preset indicators of the audio playback devices provide access to their respectively assigned entities irrespective of the associated digital audio source. More specifically, the preset indicators can provide for single press access to the respectively assigned entities, irrespective of the digital audio source. That is, a single press of a preset indicator will start the streaming and rendering of content from an entity assigned to that preset indicator regardless of the audio source providing that entity. In that regard, the presets are said to be source agnostic in that they behave in the same manner regardless of the audio source. In some cases, the single press access can be facilitated with the distribution of tokens for accessing account-based audio sources which normally require a user to login with account credentials.

The presets can be global or local at the user's option. The user can select the global or local option, e.g., during set up of the user's system account. If the user's account is set to provide for global presets, the preset assignments will be synchronized on all the audio playback devices across the audio system such that preset assignments on any one of the audio playback devices correspond to respective preset assignments on each of the other audio playback devices (e.g., such that preset indicator "1" on a first one of the audio playback devices is assigned to the same entity as preset indicator "1" on all of the other audio playback devices in the audio system), and, such that, if one of the preset assignments is changed on one of the audio playback devices, each of the other audio playback devices is automatically updated such that a corresponding change is made to a corresponding preset assignment on each of the other audio playback devices. The synchronization of the preset assignments can be managed through a combination of communications between the audio playback devices with the server, and communications among the audio playback devices themselves. A copy of the global preset assignments is stored locally in each audio playback device associated with the user's account, and a copy of the global preset assignments is also maintained on the server.

Figure 2:
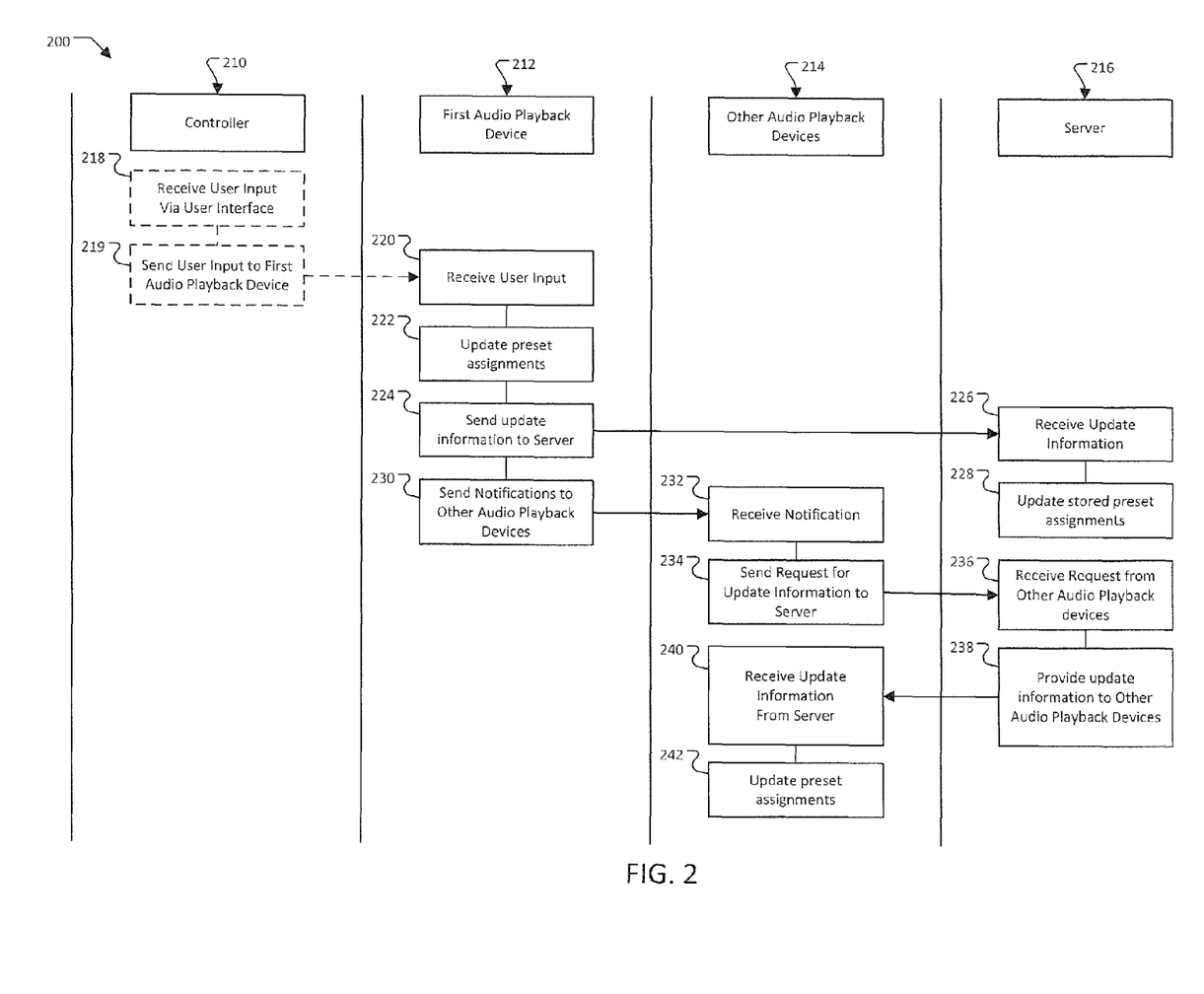
FIG. 2 is a swim lane diagram showing steps of managing/synchronizing "global" presets within the audio distribution system of FIG. 1.

FIG. 2 is a swim lane diagram 200 showing steps of managing/synchronizing "global" presets. "Swim lane" diagrams may be used to show the relationship between the various "actors" in the processes and to define the steps involved in the processes. FIG. 2 (and the other swim lane figures) may equally represent a high-level block diagram of components of the disclosure implementing the steps thereof. The steps of FIG. 2 (and all the other figures employing swim lane diagrams) may be implemented in computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Referring to FIG. 2, four swim lanes are shown including a lane for one of the controllers 210, a lane for a first one of the audio playback devices 212, a lane for the other audio playback devices 214, and a lane for the server 216. At step 220, a first audio playback device (i.e., a first one of the audio playback devices 20, FIG. 1) receives user input regarding the assignment of an entity associated with one of the digital audio sources to one of the preset indicators on the audio playback device. In some cases, the user provides input directly to the audio playback device, such as by pressing one of the preset indicators on the audio playback device. Alternatively, the user may provide input via a user interface on a selected one of the controllers (218), and the controller communicates the user input to the first audio playback device (219).

At step 222, the first audio playback device updates one or more preset assignments based on the user input. Updating can include updating data corresponding to the preset assignments stored locally (e.g., within memory) on the audio playback device.

At step 224, the first audio playback device sends information regarding the update to the one or more preset assignments to the remote server for updating a set of preset assignments stored on the server. The update information may include an updated set of preset assignments. The audio playback devices may communicate with the server via a hypertext transfer protocol. The first audio playback device may, for example, upload the update information to the server via an HTTP POST command.

The server receives the update information from the first audio playback device (226), and updates a set of preset assignments stored on the server (228). Updating the set of preset assignments can include replacing previously stored data (e.g., a previously stored set of presets) with the updated information (e.g., an updated set of preset assignments).

At step 230, the first audio playback device sends a communication to each of the other audio playback devices (e.g., a separate notification to each of the other audio playback devices) in the audio system notifying the other playback devices that there has been a change to one or more preset assignments.

At step 232, the other audio playback devices receive the notification from the first audio playback device. In response to receiving the notification of a change to the preset assignments, the other audio playback devices synchronize their preset assignments with the server. To achieve this synchronization, each of the audio playback devices sends a communication (e.g., an HTTP GET request) to the server requesting update information corresponding to the changes to the preset assignments (234).

At step 236, the server receives the requests from the other audio playback devices. In response to the requests received from the other audio playback devices, the server responds by providing update information (which may consist of an updated set of preset assignments) to the each of the other audio playback devices (238).

At step 240, the other playback devices receive the update information from the server. Upon receipt of the update information, the other playback devices update their respective preset assignments (i.e., by updating preset data) (242). Updating can include removing (deleting) old data and replacing with new, updated data. For example, updating can include replacing a previously stored set of preset assignments and replacing with an updated set of preset assignments. Following these steps all of the audio playback devices will have the same preset assignments, and the server will have a copy of the preset assignments.

Alternatively, if the user elects to set the user's system account to provide for local presets, the preset assignments will be device-specific such that the preset assignments on any one of the audio playback devices will not necessarily correspond to the preset assignments on any of the other audio playback devices. A copy of the respective local preset assignments is stored locally on each audio playback device associated with the user's account, and a copy of the local preset assignments for each audio playback device is also maintained on the server.

Figure 3:
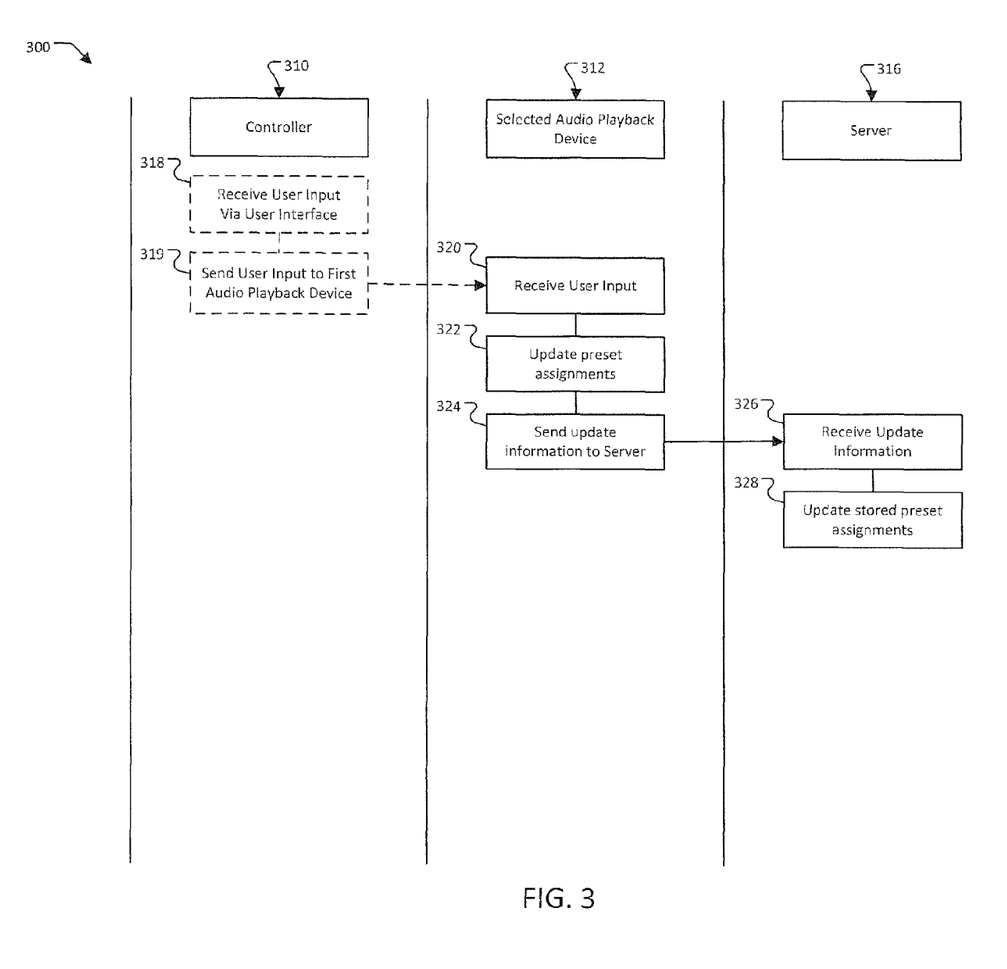
FIG. 3 is a swim lane diagram showing steps of managing "local" presets within the audio distribution system of FIG. 1.

FIG. 3 is a swim lane diagram 300 illustrating steps for managing local presets. Three swim lanes are shown including a lane for one of the controllers 310, a lane for a first one of the audio playback devices 312, and a lane for the server 316. At step 320, a selected audio playback device (i.e., a selected one of the audio playback devices 20, FIG. 1) receives user input regarding the assignment of an entity associated with one of the digital audio sources to one of the preset indicators on the audio playback device. In some cases, the user provides input directly to the audio playback device, such as by pressing one of the preset indicators. Alternatively, the user may provide input via a user interface on one of the controllers (318), and the controller communicates the user input to the selected audio playback device (319).

At step 322, the selected audio playback device updates one or more preset assignments based on the user input. Updating can include updating data corresponding to the preset assignments stored locally (e.g., within memory) on the selected audio playback device.

At step 324, the selected audio playback device sends information regarding the update to the one or more preset assignments to the remote server for updating a set of preset assignments stored in the server. The update information may include an updated set of preset assignments. The audio playback devices may communicate with the server via a hypertext transfer protocol. The first audio playback device may, for example, upload the update information to the server via an HTTP POST command.

The server receives the update information from the selected audio playback device (326), and updates a set of preset assignments stored on the server (328). Updating the set of preset assignments can include replacing previously stored data (e.g., a previously stored set of presets) with the updated information (e.g., an updated set of preset assignments). When the presets are set to local, the server will maintain (store and update) a separate set of presets for each audio playback device in the audio system.

The maintenance of a copy of the respective preset assignments for each of the audio playback devices in the server can be beneficial, for example, where the user elects to change from a local setting to a global setting after the individual devices have already been programmed with respective preset assignments. In such a situation, the server will prompt the user (e.g., via one of the controllers) to select one of the audio playback devices to serve as a master device. The server can then set the preset assignments for the selected master audio playback device as a set of global preset assignments and can provide the global preset assignments to the other audio playback devices in the audio system so as to synchronize the presets across the audio system.

Figure 4A:
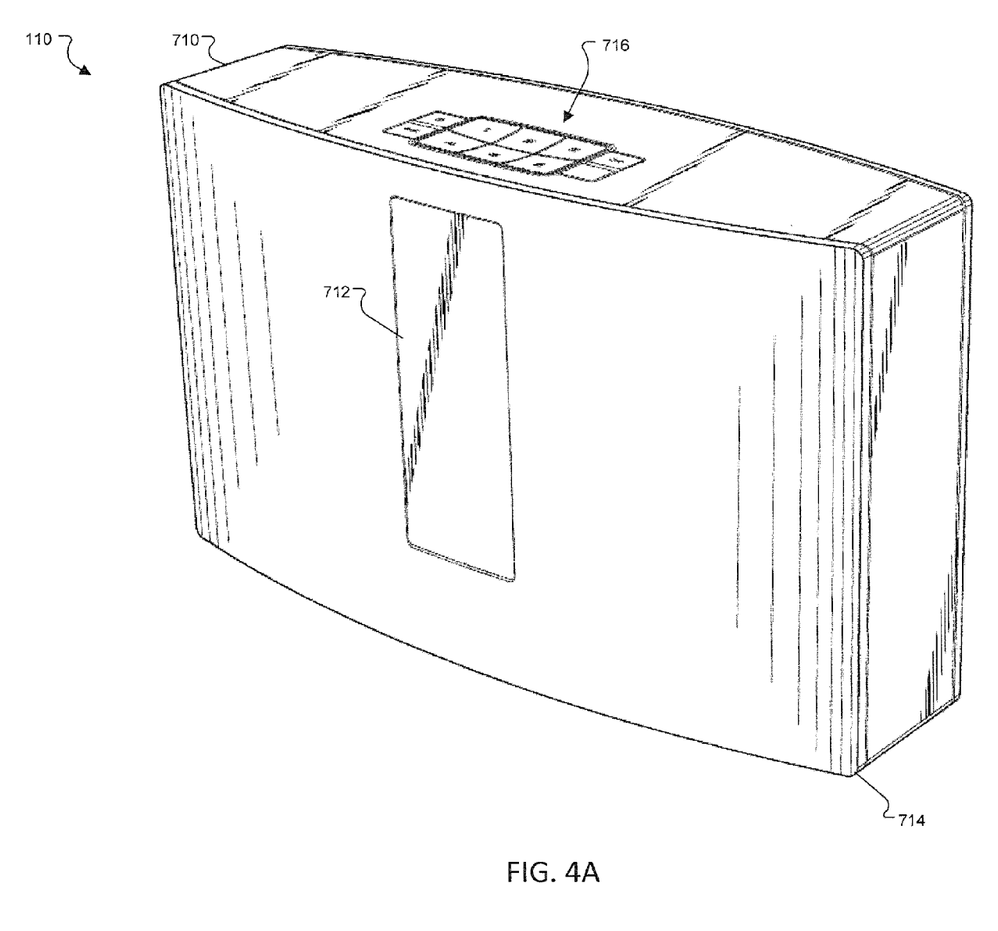
FIGS. 4A and 4B are perspective and top plan views, respectively, of an exemplary audio playback device from the audio distribution system of FIG. 1.
Figure 4B:
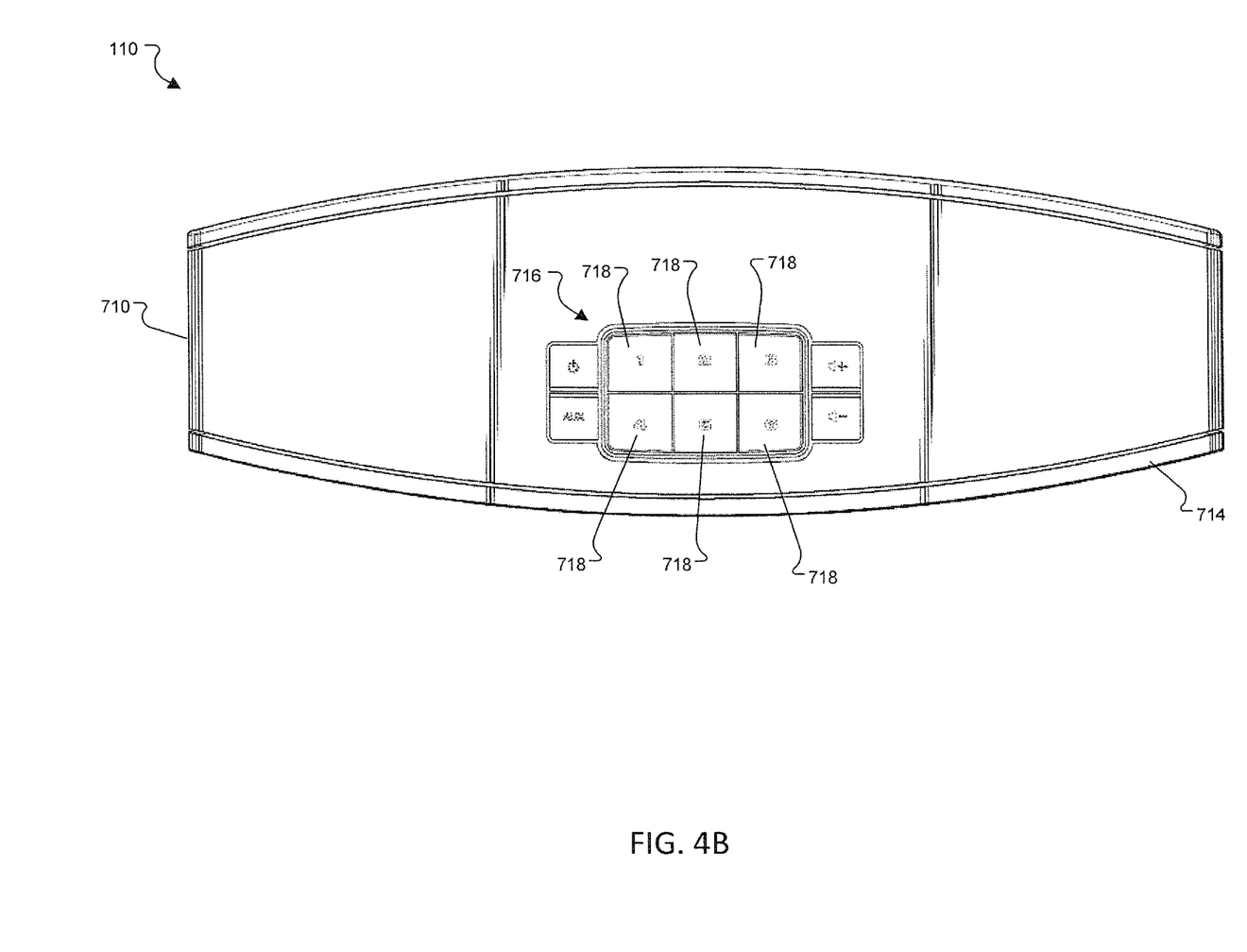
Figure 4C:
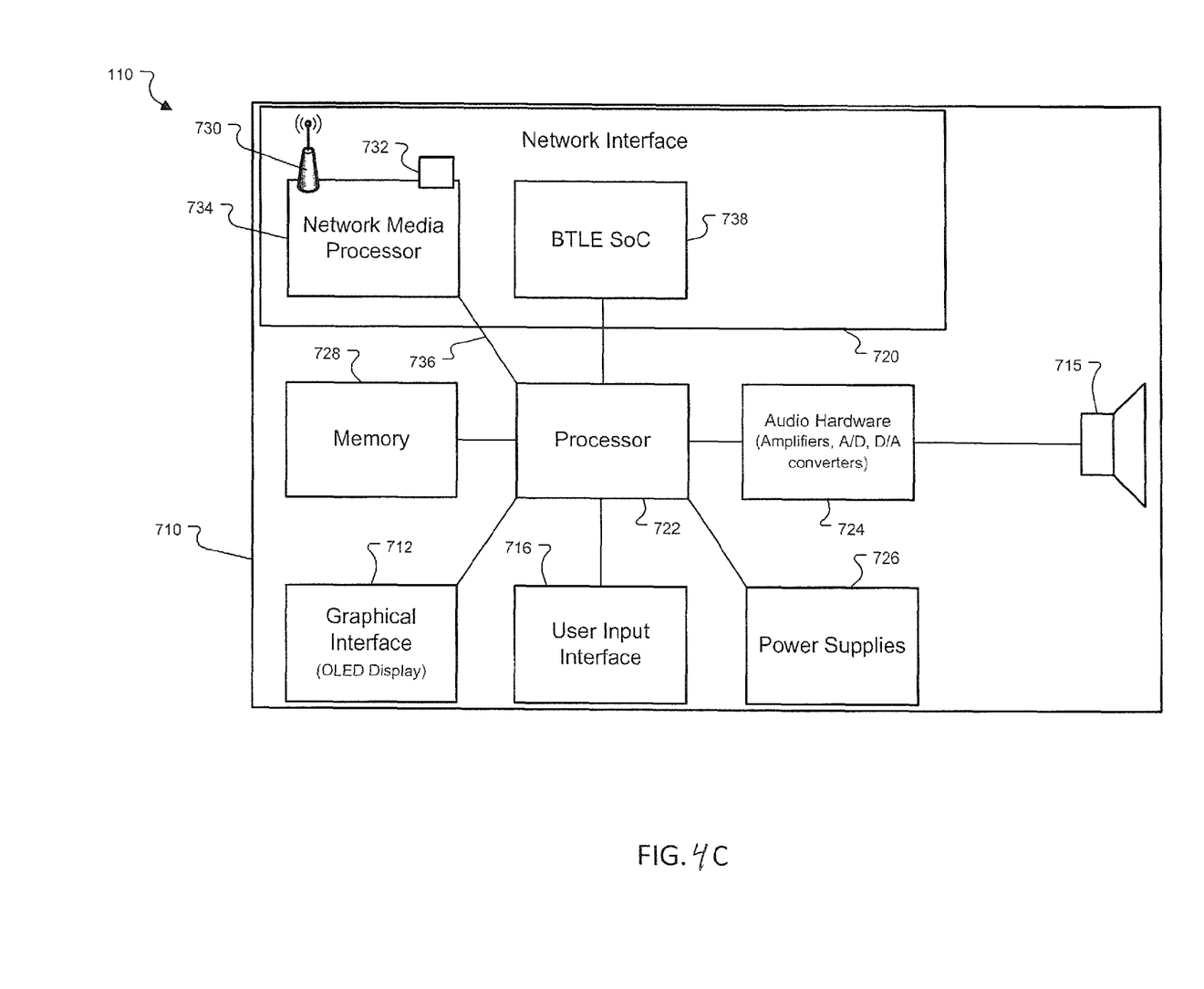
FIG. 4C is a block diagram of the audio playback device of FIGS. 4A and 4B.

An exemplary audio playback device will now be described in greater detail with reference to FIGS. 4A through 4C. Referring to FIG. 4A, an audio playback device 110 includes an enclosure 710 and on the enclosure 710 there resides a graphical interface 712 (e.g., an OLED display) which can provide the user with information regarding currently playing ("Now Playing") music and information regarding the presets. A screen 714 conceals one or more electro-acoustic transducers 715 (FIG. 4C). The audio playback device 110 also includes a user input interface 716. As shown in FIG. 4B, the user input interface 716 includes a plurality of preset indicators 718, which are hardware buttons in the illustrated example. The preset indicators 718 (numbered 1-6) provide the user with easy, one press access to entities assigned to those buttons. That is, a single press of a selected one of the preset indicators 718 will initiate streaming and rendering of content from the assigned entity.

The assigned entities can be associated with different ones of the digital audio sources such that a single audio playback device can provide for single press access to various different digital audio sources. In one example, the assigned entities include at least (i) user-defined playlists of digital music, and (ii) Internet radio stations. In another example, the digital audio sources include a plurality of Internet radio sites, and the assigned entities include individual radio stations provided by those Internet radio sites.

Notably, the preset indicators 718 operate in the same manner, at least from the user's perspective, regardless of which entities are assigned and which of the digital audio sources provide the assigned entities. That is, each preset indicator 718 can provide for single press access to its assigned entity whether that entity is a user-defined playlist of digital music provided by an NAS device or an Internet radio station provided by an Internet music service.

With reference to FIG. 4C, the audio playback device 110 also includes a network interface 720, a processor 722, audio hardware 724, power supplies 726 for powering the various audio playback device components, and memory 728. Each of the processor 722, the graphical interface 712, the network interface 720, the processor 722, the audio hardware 724, the power supplies 726, and the memory 728 are interconnected using various buses, and several of the components may be mounted on a common motherboard or in other manners as appropriate.

The network interface 720 provides for communication between the audio playback device 110 and the controller, the server, the audio sources and other audio playback devices 110 via one or more communications protocols. The network interface 720 may provide either or both of a wireless interface 730 and a wired interface 732. The wireless interface 730 allows the audio playback device 110 to communicate wirelessly with other devices in accordance with a communication protocol such as such as IEEE 802.11 b/g. The wired interface 732 provides network interface functions via a wired (e.g., Ethernet) connection.

In some cases, the network interface 720 may also include a network media processor 734 for supporting Apple Air- Play® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the LAN, the user can then stream music to the network connected audio playback devices 110 via Apple AirPlay®. A suitable network media processor is the DM870 processor available from SMSC of Hauppauge, N.Y. The network media processor 734 provides network access (i.e., the Wi-Fi network and/or Ethernet connection can be provided through the network media processor 734) and AirPlay® audio. AirPlay® audio signals are passed to the processor 722, using the I$^2$S protocol (an electrical serial bus interface standard used for connecting digital audio devices), for downstream processing and playback. Notably, the audio playback device 110 can support audio-streaming via AirPlay® and/or DLNA's UPnP protocols, and all integrated within one device.

All other digital audio coming from network packets comes straight from the network media processor 734 through a USB bridge 736 to the processor 722 and runs into the decoders, DSP, and eventually is played back (rendered) via the electro-acoustic transducer(s) 715.

The network interface 710 can also include a Bluetooth low energy (BTLE) system-on-chip (SoC) 738 for Bluetooth low energy applications (e.g., for wireless communication with a Bluetooth enabled controller). A suitable BTLE SoC is the CC2540 available from Texas Instruments, with headquarters in Dallas, Tex.

Streamed data pass from the network interface 720 to the processor 722. The processor 722 can execute instructions within the audio playback device (e.g., for performing, among other things, digital signal processing, decoding, and equalization functions), including instructions stored in the memory 728. The processor 722 may be implemented as a chipset of chips that include separate and multiple analog and digital processors. The processor 722 may provide, for example, for coordination of other components of the audio playback device 110, such as control of user interfaces, and applications run by the audio playback device 110. A suitable processor is the DA921 available from Texas Instruments.

The processor 722 provides a processed digital audio signal to the audio hardware 724 which includes one or more digital-to-analog (D/A) converters for converting the digital audio signal to an analog audio signal. The audio hardware 724 also includes one or more amplifiers which provide amplified analog audio signals to the electroacoustic transducer(s) 715 for playback. In addition, the audio hardware 724 may include circuitry for processing analog input signals to provide digital audio signals for sharing with other devices in the acoustic system 10.

The memory 728 stores information within the audio playback device 110. In this regard, the memory 728 may store account information, such as the preset information discussed above. The memory 728 may also provide storage for "tokens" for facilitating single press access to the digital audio sources (e.g., Internet radio services). A token, as used herein, is a unique identifier that may be provided by the digital audio source and which allows the digital audio source to recognize the audio playback device 110 as being associated with a user's account with the digital audio source and without requiring the user to enter credentials (e.g., user name, password, etc.) each time the audio playback device 110 attempts to access the digital audio source.

The memory 728 may include, for example, flash memory and/or non-volatile random access memory (NVRAM). In some implementations, instructions (e.g., software) are stored in an information carrier. The instructions, when executed by one or more processing devices (e.g., the processor 722), perform one or more processes, such as those described above. The instructions can also be stored by one or more storage devices, such as one or more computer- or machine-readable mediums (for example, the memory 728, or memory on the processor). The instructions may include instructions for performing decoding (i.e., the software modules include the audio codecs for decoding the digital audio streams), as well as digital signal processing and equalization.

The instructions may also include instructions for enabling certain "browsing" functionality. That is, at least in some cases, the controllers serve as graphical remote controls for the audio playback devices 110 and do not communicate with the digital audio sources directly, but, instead, communicate with the digital audio sources via the audio playback devices.

Figure 5:
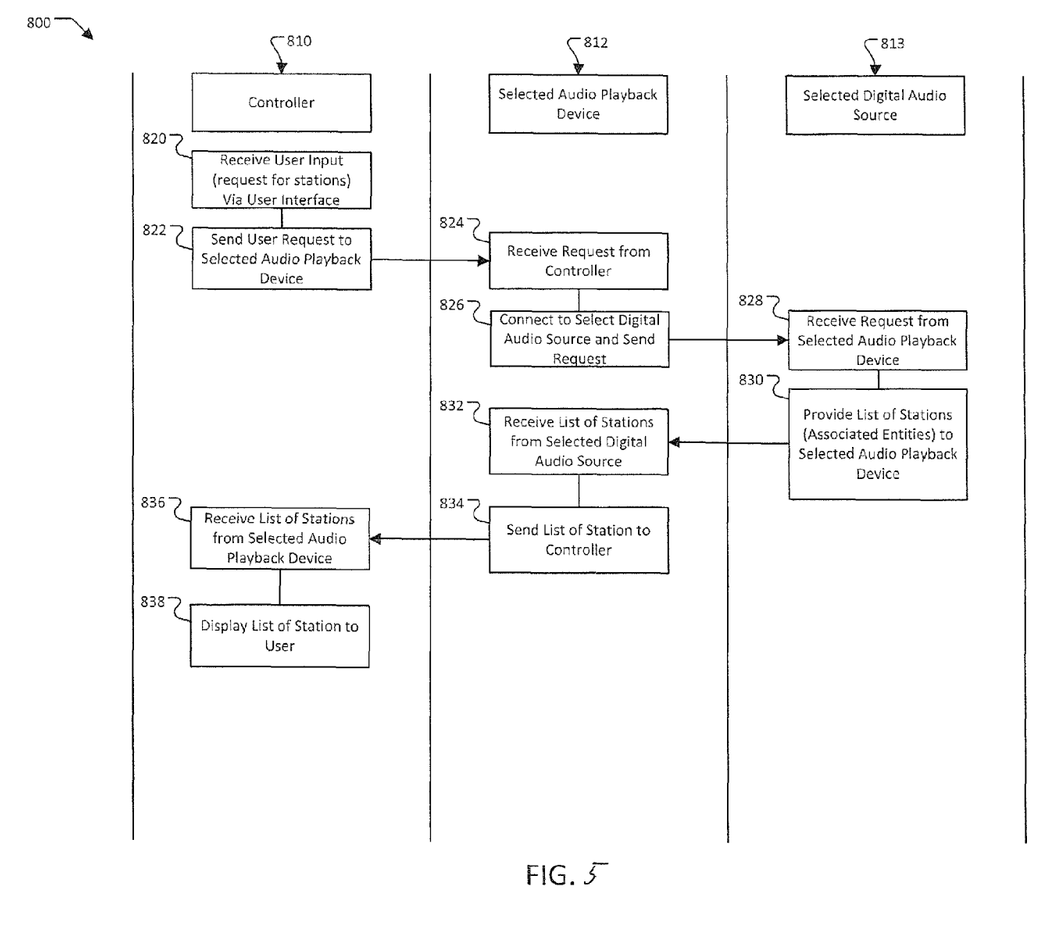
FIG. 5 is a swim lane diagram showing steps for browsing entities associated with one of the digital audio sources within the audio distribution system of FIG. 1.

FIG. 5 is a swim lane diagram 800 showing steps for browsing entities (e.g., stations) associated with one of the digital audio sources. Three swim lanes are shown in FIG. 5 including a lane for a selected one of the controllers 810, a lane for a selected one of the audio playback devices 812, and a lane for a selected one of the digital audio sources 813.

At step 820, the controller receives input from a user requesting a list of stations (entities) from a selected one of the digital audio sources (i.e., a digital audio source, within the audio system, that is selected by the user via a user interface provided by the controller). At step 822, the controller sends the request to a selected one of the audio playback devices (i.e., an audio playback device, within the audio system, that is selected by the user via a user interface provided by the controller).

At step 824, the selected one of the audio playback devices receives the request from the controller. In response, the audio playback device connects to the selected digital audio source via the router and Internet connection and requests a list of entities (e.g., stations) associated with that source (826).

At step 828, the selected one of the digital audio sources receives the request from the audio playback device. In response to the request from the audio playback device, the audio source sends a list of available entities to the audio playback device (830). The audio playback device receives the list of available entities (832) and the audio playback device sends the list of available entities along to the controller (834).

The controller receives the list of available entities from the audio playback device (836) and displays the list to the user (838).

When a user has chosen to have an audio stream played on more than one of the audio playback devices, in order for the music to be properly synchronized such that the same tracks are playing synchronously on all of the selected audio playback devices there needs to be appropriate and sufficient coordination among all of the audio playback devices. One manner in which such coordination can be accomplished is to use one of the audio playback devices to control the distribution of audio data to all of the other active audio playback devices that are being used to play content. This device which controls audio data distribution to the other active playback devices can be considered a master device, and the rest of the active devices (i.e., the rest of the devices that are being used to play content) can be considered to be slave devices. Since all of the audio playback devices 22, 24 and 26 have the same functionality, each of them can act as the master device and each can act as a slave.

Figure 6:
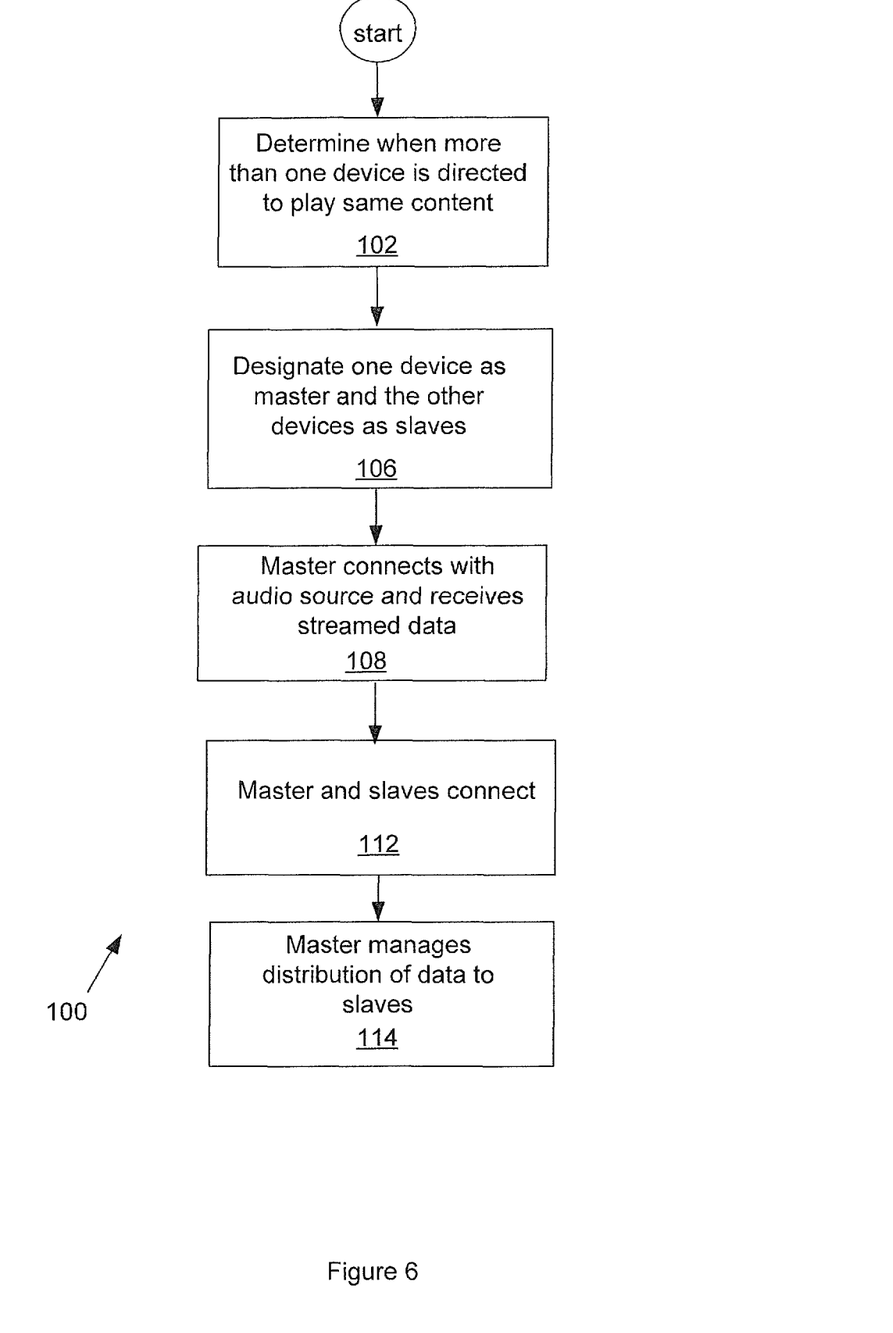
FIG. 6 illustrates a methodology for accomplishing synchronous playback of a single audio stream on a number of audio playback devices.

A methodology for accomplishing the simultaneous playback of a single audio stream on a number of audio playback devices is illustrated by methodology 100, FIG. 6. The first step 102 is to determine when more than one audio playback device has been directed to play the same audio content. Each audio playback device has a processor and associated computer memory. Since the active devices are all able to communicate with each other over network 30 (and potentially at least in part via server 50), each device can maintain in its local memory information regarding the identification and network address of each of the other devices. The devices can also monitor via the network and store in local memory the audio data that is being played by the other devices. The determination of when more than one audio playback device has been directed to play the same audio content can be based on two or more devices being connected to or attempting to connect to the same audio source (e.g., an Internet radio station or a local playlist). One non-limiting specific example is that the audio content identifiers of the audio being streamed or which the user is trying to access can be reviewed and compared among multiple devices. Another example is when the same preset is pressed on one device while another device is already playing the source associated with that preset.

When more than one audio playback device has been directed to play the same audio content, one device is designated as the master device and all of the other active devices are designated as slave devices, step 106. The selection of a master device can be accomplished in a desired fashion. In one non-limiting example the audio playback device with the best network link speed can be selected as the master device. The master would communicate this status to the slaves, which would acknowledge their status to all of the other audio playback devices. Once the master/slave relationships have been established, audio data streaming to all of the audio playback devices is managed by connecting the master to the audio source such that it receives the streamed data, step 108. The master and slaves then connect to each other over the network, step 112. This can be accomplished by having the slaves connect a data socket to the master. The network is now configured to distribute via the master the same streamed audio data to each of the active audio playback devices.

The master manages distribution of data to the slaves, step 114. This management can be accomplished in a manner that is known in the networking field. For example, the master device can push the audio data it has received to the slave devices, or the master can make the audio data available for the slave devices to retrieve. In one non-limiting embodiment the master device receives the streamed audio data from the source and creates packets that are made available for retrieval by each of the slaves. The data packets can be time stamped so that each of the devices plays the data in the proper order and at the proper time such that the audio outputs of the devices are synchronized. As a result, for example in a home network where there are audio playback devices in several rooms, the same music will be playing at the same time in all of the rooms.

Figure 7:
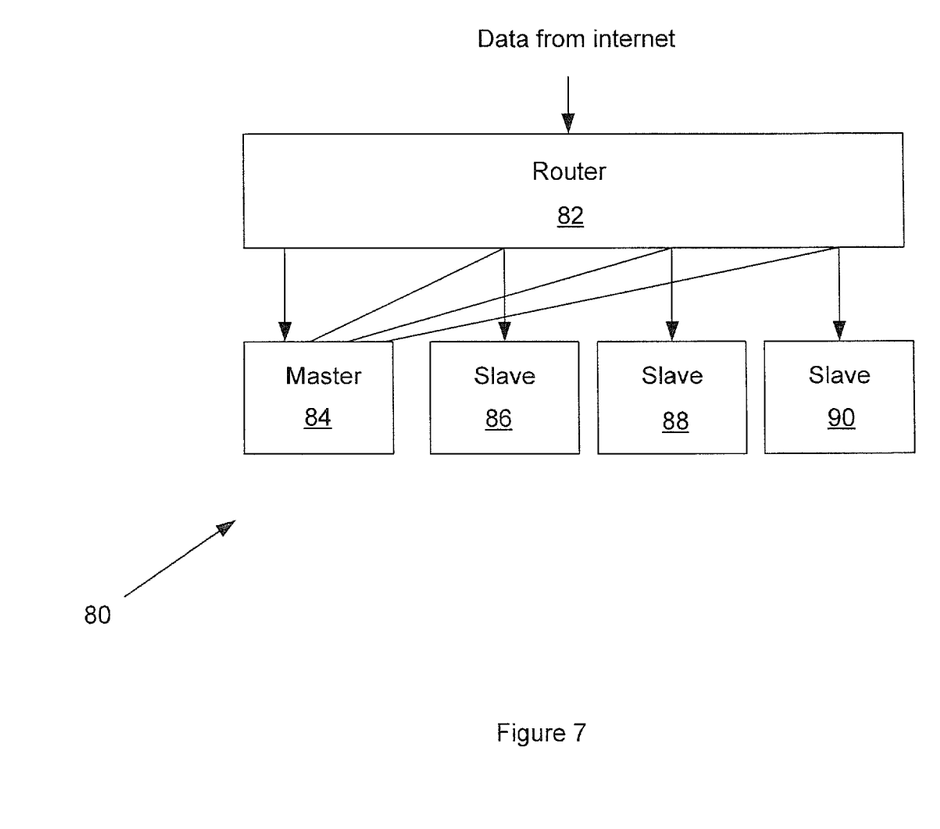
FIG. 7 illustrates a relationship among master and slave devices in an audio distribution system.

FIG. 7 schematically depicts system 80 in which audio data is routed from a master device to one or more slave devices. Data from the internet is received by router 82 and routed to master audio playback device 84. Device 84 controls the distribution of the data to slave audio playback devices 86, 88 and 90. The data moves from the master to each slave through router 82.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method for managing the distribution of audio data to a plurality of networked audio playback devices that are adapted to play audio, where the audio data is delivered from one or more digital audio sources to one or more of the audio playback devices, and where the audio playback devices are each adapted to monitor via the network and store in their local memory information regarding audio data that is being played by other audio playback devices, the method comprising:
 determining when more than one of the audio playback devices has been directed to play the same audio data, comprising comparing audio content identifiers of audio being streamed to one audio playback device to the audio content identifiers of audio which another audio playback device is trying to access; and
 in response to the determination, directing that two or more of the audio playback devices synchronously play the same audio data.

2. The method of claim 1 wherein the audio data comprises streamed audio data.

3. The method of claim 1 wherein the audio playback devices each comprise a set of user-selectable preset indicators, wherein each preset indicator is configured to have assigned to it a digital audio source.

4. The method of claim 3 wherein determining when more than one of the audio playback devices has been directed to play the same audio data further comprises determining whether a digital audio source selected by way of the user selection of a preset indicator of one of the audio playback devices is the same as the digital audio source selected by way of the user selection of a preset indicator for a different audio playback device.

5. The method of claim 1 wherein directing that two or more of the audio playback devices synchronously play the same audio data comprises designating one of the audio playback devices as a master device and one or more other audio playback devices as slave devices, where the master device receives the audio data from an audio source and distributes this audio data to the slave devices.

6. The method of claim 5 further comprising establishing a data connection between the master device and the audio source, and establishing data connections between the master device and the slave devices.

7. The method of claim 6 wherein the master device receives an audio stream from the audio source and manages its distribution to the slave devices.

8. The method of claim 7 wherein the master device formats the received audio stream into packets and associates with the packets a time stamp that indicates when the packets are to be rendered into audio by the slave devices, and then sends the packets to the slave devices.

9. The method of claim 1 wherein each audio playback device comprises a computer memory and wherein the method further comprises storing in the memory of each audio playback device an identification of each other audio playback device.

10. The method of claim 9 wherein the identification of the other audio playback devices stored in the memory comprises the network address of each other audio playback device.

11. The method of claim 10 wherein determining when more than one of the audio playback devices has been directed to play the same audio data further comprises detecting the audio source for a particular audio playback device that is receiving audio from an audio source.

12. The method of claim 11 wherein determining when more than one of the audio playback devices has been directed to play the same audio data further comprises comparing the detected audio source for the particular audio playback device to the audio sources for the other audio playback devices.

13. The method of claim 12 further comprising storing in the memory of each audio playback device an identification of any audio that is being played by each other audio playback device.

14. A method for managing the distribution of streamed audio data to a plurality of networked audio playback devices that are adapted to play audio, where audio data is delivered from a digital audio source to one or more of the audio playback devices, and wherein the audio playback devices each comprise a set of user-selectable preset indicators, wherein each preset indicator is configured to have assigned to it a digital audio source, the method comprising:
  determining when more than one of the audio playback devices has been directed to play the same audio data, comprising determining whether a digital audio source selected by way of the user selection of a preset indicator of one of the audio playback devices is the same as the digital audio source selected by way of the user selection of a preset indicator for a different audio playback device;
  in response to the determination, directing that two or more of the audio playback devices synchronously play the same audio data, comprising designating one of the audio playback devices as a master device and one or more other audio playback devices as slave devices, where the master device distributes audio data to the slave devices;
  establishing a data connection between the master device and the audio source;
  establishing data connections between the master device and the slave devices;
  wherein the master device receives an audio stream from the audio source and distributes it to the slave devices; and
  wherein the master device formats the received audio stream into packets and associates with the packets a time stamp that indicates when the packets are to be rendered into audio by the slave devices, and then sends the packets to the slave devices.

15. A computer device configured to manage the distribution of audio data to a plurality of networked audio playback devices that are adapted to play audio, where audio data is delivered from a digital audio source to one or more of the audio playback devices, and where the audio playback devices each comprise a set of user-selectable preset indicators, wherein each preset indicator is configured to have assigned to it a digital audio source, the computer device comprising:
  a memory; and
  a processor communicatively coupled to the memory and that is configured to:
    determine when more than one of the audio playback devices has been directed to play the same audio data, comprising determining whether a digital audio source selected by way of the user selection of a preset indicator of one of the audio playback devices is the same as the digital audio source selected by way of the user selection of a preset indicator for a different audio playback device; and
    in response to the determination, direct that two or more of the audio playback devices synchronously play the same audio data.

16. The computer device of claim 15 wherein directing that two or more of the audio playback devices synchronously play the same audio data comprises designating one of the audio playback devices as a master device and one or more other audio playback devices as slave devices, where the master device receives the audio data from an audio source and distributes this audio data to the slave devices.

17. The computer device of claim 16 wherein the master device receives an audio stream from the audio source and manages its distribution to the slave devices, and wherein the master device formats the received audio stream into packets and associates with the packets a time stamp that indicates when the packets are to be rendered into audio by the slave devices, and then sends the packets to the slave devices.

18. The computer device of claim 15 wherein each audio playback device comprises a computer memory and wherein the processor is further configured to cause the storage in the memory of each audio playback device an identification of each other audio playback device, and wherein the identification of the other audio playback devices stored in the memory comprises the network address of each other audio playback device.

19. The computer device of claim 18 wherein determining when more than one of the audio playback devices has been directed to play the same audio data further comprises detecting the audio source for a particular audio playback device that is receiving audio from an audio source, and comparing the detected audio source for the particular audio playback device to the audio sources for the other audio playback devices.

* * * * *